(12) United States Patent
Atkins et al.

(10) Patent No.: US 7,984,378 B1
(45) Date of Patent: Jul. 19, 2011

(54) MANAGEMENT OF MEETINGS BY GROUPING

(75) Inventors: Richard Atkins, Chatswood (AU); Rohan Lenard, Birchgrove (AU); David Preshan Thambiratnam, Ashfield (AU)

(73) Assignee: Avaya Inc., Basking Ridge, NJ (US)

( * ) Notice: Subject to any disclaimer, the term of this patent is extended or adjusted under 35 U.S.C. 154(b) by 26 days.

(21) Appl. No.: 11/350,050

(22) Filed: Feb. 7, 2006

(51) Int. Cl.
*G06F 3/00* (2006.01)

(52) U.S. Cl. ........................................ 715/733
(58) Field of Classification Search .................. 715/963
See application file for complete search history.

(56) References Cited

U.S. PATENT DOCUMENTS

| | | | |
|---|---|---|---|
| 4,819,191 A | 4/1989 | Scully et al. | |
| 4,831,552 A | 5/1989 | Scully et al. | |
| 5,050,077 A | 9/1991 | Vincent | |
| 5,124,912 A | 6/1992 | Hotaling et al. | |
| 5,197,000 A | 3/1993 | Vincent | |
| 5,206,903 A | 4/1993 | Kohler et al. | |
| 5,216,603 A | 6/1993 | Flores et al. | |
| 5,323,314 A | 6/1994 | Baber et al. | |
| 5,428,784 A | 6/1995 | Cahill, Jr. | |
| 5,555,346 A | 9/1996 | Gross et al. | |
| 5,619,555 A | 4/1997 | Fenton et al. | |
| 5,627,978 A | 5/1997 | Altom et al. | |
| 5,774,867 A | 6/1998 | Fitzpatrick et al. | |
| 5,793,365 A | 8/1998 | Tang et al. | |
| 5,813,013 A | 9/1998 | Shakib et al. | |
| 5,828,747 A | 10/1998 | Fisher et al. | |
| 5,889,945 A | 3/1999 | Porter et al. | |
| 5,893,073 A | 4/1999 | Kasso et al. | |
| 5,905,793 A | 5/1999 | Flockhart et al. | |
| 5,920,701 A | 7/1999 | Miller et al. | |
| 5,960,406 A | 9/1999 | Rasansky et al. | |
| 5,963,913 A | 10/1999 | Henneuse et al. | |
| 5,982,873 A | 11/1999 | Flockhart et al. | |
| 6,064,976 A | 5/2000 | Tolopka | |
| 6,085,166 A | 7/2000 | Beckhardt et al. | |
| 6,101,480 A | 8/2000 | Conmy et al. | |
| 6,147,685 A | 11/2000 | Bliss et al. | |
| 6,163,607 A | 12/2000 | Bogart et al. | |

(Continued)

FOREIGN PATENT DOCUMENTS

EP    1014286    6/2000

(Continued)

OTHER PUBLICATIONS

Jim Boyce, "Microsoft Office Outlook 2003 Inside Out," Nov. 5th 2003, Microsoft Press, Chapters 1, 19 and 20.*

(Continued)

*Primary Examiner* — William L Bashore
*Assistant Examiner* — Daniel Um
(74) *Attorney, Agent, or Firm* — Sheridan Ross P.C.

(57) ABSTRACT

A meeting management application that permits the manipulation of meetings by groups is provided. The meeting management application incorporates or is associated with a scheduling application for receiving and maintaining meeting information. The scheduling application may additionally check for conflicts between scheduled meetings and other meetings and events. The meeting management application may additionally include or be associated with a grouping application. The grouping application may permit the creation of groups of meetings having one or more specified items of associated information. Once a group of meetings is defined, modifications to information associated with each meeting within the group can be applied to the included meetings globally.

20 Claims, 4 Drawing Sheets

U.S. PATENT DOCUMENTS

| | | |
|---|---|---|
| 6,173,053 B1 | 1/2001 | Bogart et al. |
| 6,192,111 B1 | 2/2001 | Wu |
| 6,192,122 B1 | 2/2001 | Flockhart et al. |
| 6,272,074 B1 | 8/2001 | Winner |
| 6,360,217 B1 | 3/2002 | Gopal et al. |
| 6,363,352 B1 | 3/2002 | Dailey et al. |
| 6,377,965 B1 | 4/2002 | Hachamovitch et al. |
| 6,434,571 B1 | 8/2002 | Nolte |
| 6,570,555 B1 | 5/2003 | Prevost et al. |
| 6,594,637 B1 | 7/2003 | Furukawa et al. |
| 6,640,230 B1 | 10/2003 | Alexander et al. |
| 6,662,309 B2 | 12/2003 | Ando et al. |
| 6,675,356 B1 | 1/2004 | Adler et al. |
| 6,694,335 B1 | 2/2004 | Hopmann et al. |
| 6,731,323 B2 | 5/2004 | Doss et al. |
| 6,988,128 B1 | 1/2006 | Alexander et al. |
| 7,007,235 B1 | 2/2006 | Hussein et al. |
| 7,016,909 B2 | 3/2006 | Chan et al. |
| 7,027,995 B2 | 4/2006 | Kaufman et al. |
| 7,035,865 B2 | 4/2006 | Doss et al. |
| 7,082,402 B2 | 7/2006 | Conmy et al. |
| 7,113,797 B2 | 9/2006 | Kelley et al. |
| 7,130,885 B2 | 10/2006 | Chandra et al. |
| 7,149,810 B1 | 12/2006 | Miller et al. |
| 7,155,435 B1 | 12/2006 | Day et al. |
| 7,187,384 B2 | 3/2007 | Noyle |
| 7,188,073 B1 | 3/2007 | Tam et al. |
| 7,254,569 B2 | 8/2007 | Goodman et al. |
| 7,343,312 B2 | 3/2008 | Capek et al. |
| 7,343,313 B2 | 3/2008 | Dorenbosch et al. |
| 7,353,466 B2 | 4/2008 | Crane et al. |
| 7,363,590 B2 | 4/2008 | Kerr et al. |
| 7,383,291 B2 | 6/2008 | Guiheneuf et al. |
| 7,383,303 B1 | 6/2008 | Bort |
| 7,395,221 B2 | 7/2008 | Doss et al. |
| 7,436,654 B2 | 10/2008 | Cho |
| 7,440,961 B1 | 10/2008 | Matousek |
| 7,519,672 B2 | 4/2009 | Boss et al. |
| 7,595,717 B2 | 9/2009 | Boss et al. |
| 7,693,734 B2 | 4/2010 | Christenson et al. |
| 2001/0054072 A1 | 12/2001 | Discolo et al. |
| 2002/0085701 A1 | 7/2002 | Parsons et al. |
| 2002/0117847 A1 | 8/2002 | Ede et al. |
| 2002/0120600 A1 | 8/2002 | Schiavone et al. |
| 2002/0144136 A1 | 10/2002 | Stornetta et al. |
| 2003/0046304 A1 | 3/2003 | Peskin et al. |
| 2003/0069880 A1 | 4/2003 | Harrison et al. |
| 2003/0149606 A1 | 8/2003 | Cragun et al. |
| 2003/0154293 A1 | 8/2003 | Zmolek |
| 2003/0163537 A1 | 8/2003 | Rohall et al. |
| 2004/0054726 A1 | 3/2004 | Doss et al. |
| 2004/0128181 A1 | 7/2004 | Zurko et al. |
| 2004/0168133 A1 | 8/2004 | Wynn et al. |
| 2004/0192857 A1 | 9/2004 | Borer et al. |
| 2004/0199663 A1 | 10/2004 | Horvitz et al. |
| 2004/0254998 A1 | 12/2004 | Horvitz |
| 2005/0069099 A1 | 3/2005 | Kozdon et al. |
| 2005/0125246 A1 | 6/2005 | Muller et al. |
| 2005/0165631 A1 | 7/2005 | Horvitz |
| 2005/0192857 A1 | 9/2005 | Levine |
| 2005/0198144 A1 | 9/2005 | Kraenzel et al. |
| 2006/0004843 A1 | 1/2006 | Tafoya et al. |
| 2006/0020889 A1 | 1/2006 | Coppinger et al. |
| 2006/0031326 A1 | 2/2006 | Ovenden |
| 2006/0031470 A1 | 2/2006 | Chen et al. |
| 2006/0047557 A1 | 3/2006 | Bieselin et al. |
| 2006/0069686 A1 | 3/2006 | Beyda et al. |
| 2006/0184584 A1 | 8/2006 | Dunn et al. |
| 2006/0190485 A1 | 8/2006 | Adams et al. |
| 2006/0242109 A1 | 10/2006 | Pereira et al. |
| 2007/0016878 A1 | 1/2007 | Forlenza et al. |
| 2007/0118415 A1 | 5/2007 | Chen et al. |
| 2007/0174104 A1 | 7/2007 | O'Sullivan et al. |
| 2007/0265903 A1 | 11/2007 | Blair et al. |
| 2008/0005685 A1 | 1/2008 | Drews et al. |
| 2008/0034425 A1 | 2/2008 | Overcash et al. |
| 2008/0037733 A1 | 2/2008 | Chen et al. |

FOREIGN PATENT DOCUMENTS

| | | |
|---|---|---|
| EP | 1 560 138 | 8/2005 |
| WO | WO 2005/010715 | 2/2005 |

OTHER PUBLICATIONS

Jim Boyce, "Microsoft Office Outlook 2003 Inside Out," Nov. 5, 2003, Microsoft Press, Chapter 19, "Using Color Effectively".*

Jim Boyce, "Microsoft Office Outlook 2003 Inside Out," Nov. 2003, Microsoft Press, Chapters 1, 2, 19 and 20.*

Step-By-Step Manual, Microsoft Outlook, Online Training Solutions, Inc. (2004).

.effectivemeetings.com (SMART Technologies, Inc., May 2003).

en.wikipedia.org/wiki/Microsoft Outlook; printed Mar. 14, 2006; 4 pages.

bcentral.co.uk/products/microsoft-outlook.mspx; printed Mar. 14, 2006; 2 pages.

"Avaya™ Unified Communication Center (UCC) Speech Access Solution", Avaya, Inc. (2002), 4 pages.

"Avaya by Example; Three-Week Wonder: Avaya Unified Communication Center Speech Access Gives Road Warriors 15 Additional Days Each Year", Avaya, Inc. (2005) 3 pages.

Arthur M. Rosenberg and David A. Zimmer, "Migrating to Enterprise-Wide Communications: The Branch Office Dilemma", May 2003, 14 pages.

Arthur M. Rosenberg and David A. Zimmer, "Beyond VoIP: Enterprise Perspectives on Migrating to Multi-Modal Communications and Wireless Mobility", (Oct. 2004) 38 pages.

AIM Acronym Dictionary, .aim.com/acronyms.adp (Jan. 16, 2007) 7 pages.

AIM Presence Services, developer.aim.com/presenceMain.jsp (2006) 2 pages.

AIM Bots, developer.aim.com/botMain.jsp (2006) 2 pages.

AIM Buddy Info, buddyinfo.aim.com/ (2006) 2 pages.

IVTTA Turin 98, "The Linguistic Components of the Reward Dialogue Creation Environment and Run Time System", cpk.auc.dk/~tb/articles/ivtta98.htm (Sep. 1998) 13 pages).

Rob Kassel, "How Speech Recognition Works", .microsoft.com/speech/docs/How_Speech_Works_Article.htm (Nov. 30, 2004) 4 pages.

"How To Use a TTY", NETAC Teacher Tipsheet, 72.14.203.104/search?q=cache:JdktLkxPgMUJ: .netac.rit.edu/downloads/TPSHT_TTY.pdf+%22teletypewriter%22+ . . . (1999) 4 pages.

"TTY Brochure Feb. 2006", 72.14.203.104/search?q=cache:O3tW0eQtbTEF: ods.utk.edu/brochures/TTYBrochureFebruary2006.pdf+%22teletypewrite . . . (Feb. 2006) 3 pages.

Tony Vitale, "Hardware and Software Aspects of a Speech Synthesizer Developed for Persons With Disabilities", codi.buffalo.edu/archives/computing/.dec.speech (1993).

Dave Anderson and George McNeill, "Artificial Neural Networks Technology", dacs.dtic.mil/techs/dacs_reports/text/neural_nets.txt (Aug. 20, 1992) 145 pages.

U.S. Appl. No. 10/770,640, Mohler (Feb. 2, 2004).

U.S. Appl. No. 11/488,487, Daily et al. (Jul. 17, 2006).

U.S. Appl. No. 11/554,442, Atkins et al. (Oct. 30, 2006).

U.S. Appl. No. 11/554,478, Atkins et al. (Oct. 30, 2006).

U.S. Appl. No. 11/554,497, Chu et al. (Oct. 30, 2006).

U.S. Appl. No. 11/619,145, Atkins et al. (Jan. 2, 2007).

U.S. Appl. No. 11/669,707, Blair et al. (Jan. 31, 2007).

"Meetings in America", MCI Conferencing, available at http://e-meetings.mci.com/meetingsinamerica/uswhitepaper.php3, website updated Aug. 19, 2003, pp. 1-12.

"WebAccess Client User Guide" Novell GroupWise 6.5, Oct. 31, 2005, 68 pages.

Chapters 4, 5 and 7 from Microsoft® Office Outlook® 2003; "Step by Step"; Online Training Solutions, Inc.

Dey et al., CybreMinder: A Context-Aware System for Supporting Reminders, Handheld and Ubiquitous Computing: Second International Symposium, HUC 2000, Bristol, UK, Sep. 2000. Proceedings, Jul. 31, 2003, 15 pages, vol. 1927/2000, Springer Berlin/Heidelberg.

"FreeBusy—Microsoft Outlook email autoresponder" http://freebusy.4team.biz/; printed May 24, 2006; 4 pages.

Yin "[Design] linking and grouping items", available at http://lists.osafoundation.org/pipermail/design/2005-August/003159.html Aug. 1, 2005, pp. 1-2.

Background for the above-captioned application (previously provided).

Avantgo: AvantGo launches new release of Pylon products; AvantGo Pylon 5.1 offers new support for Domino 6, Palm OS 5 and custom repeating meetings M2 Presswire. Coventry: Jan. 24, 2003. p. 1-4.

"Special Edition Using Lotus Notes and Domino 5" (Published by Que, Aug. 23, 1999, ISBN 0-7897-1814-6.

"Windows Client User Guide" (Novell Groupwise 7.0, Mar. 14, 2008, copyright 2005-2008) discloses Groupwise 7.0 (released Aug. 15, 2005), 389 pages.

Avaya Case Study (Advertising Agency Uses Avaya Unified Messenger to Streamline Communications, 2003 Avaya Inc.), 2 pages.

U.S. Appl. No. 12/570,933, filed Sep. 30, 2009, Mohler.

Avaya Press Release (Avaya Introduces IBM Lotus Domino Version of Its Market-Leading Unified Messaging Software, http://www.avaya.com/usa/Error404.aspx?currentpath=master-usa/en-us/corporate/pressroom/pressreleases/2003/pr-03,Jan. 27, 2003), 4 pages.

Avaya Unified Messenger Client User Guide (2002 Avaya Inc.)

Avaya Web Pages (Retrieved Archive.org from Jun. 13, 2004), 167 pages.

Avaya Unified Messenger Solution—Microsoft Exange 2000 version Installation Guide (2002 Avaya Inc.) 164 pages.

Avaya Unified Messenger Solution—Microsoft Exange Version, 2000 version (2002 Avaya Inc), 8 pages.

Clayton, Brad "Microsoft Outlook 2003 Enhancements", modified Apr. 19, 2004, Purdue University, 4 pages.

Raider, "Make Address Book Smart Groups auto-complete in mail," MacOsHints.com, contributed Jun. 29, 2005, pp. 1-4.

\* cited by examiner

MANAGEMENT OF MEETINGS BY GROUPING

FIELD OF THE INVENTION

The management of meetings by grouping. In particular, methods and apparatuses are disclosed according to which individual meetings may be associated with one or more other meetings and modifications may be applied to the associated meetings as a group.

BACKGROUND

Various devices and applications are available that allow persons to maintain records of scheduled meetings and events. Such devices and applications often include features that allow users to modify entries. For example, the time and/or place of scheduled meetings can be modified by the user by changing the appropriate field or fields containing such information. In addition, such applications also commonly provide for reminder and alarm features.

Project planning applications are also available that allow users to coordinate events comprising a larger overall project. More particularly, project planning applications can provide a central location in which a number of related events can be graphically juxtaposed with one another to assist planners in efficiently scheduling such events.

The scheduling of meetings can be complicated, because, by definition, meetings require the participation of two or more persons. The scheduling of meetings is further complicated where there are a large number of participants or where participants are located in different time zones. As a result, scheduling a meeting can be a time consuming and complicated task.

Oftentimes, it is necessary to reschedule meetings. For example, due to changes in travel plans, a user may need to reschedule a meeting to comply with the new travel schedule. Although a change in a single meeting can be accommodated by modifying related information, such as the scheduled date and time of the meeting, conventional application programs have been unable to identify a group of meetings needing to be rescheduled due to changes in travel plans or other events. As a result, users have had to reschedule each individual meeting within a group of related meetings needing to be rescheduled on an individual basis. In addition, application programs have been incapable of allowing users to make changes to groups of related meetings, and provide the user with an indication as to whether the proposed change to the group of meetings introduces scheduling or other conflicts. Application programs have also been unable to allow users to create other groups of meetings and allow the meetings to be manipulated by the grouping.

SUMMARY

According to the embodiments of the present invention, a scheduling process or application incorporating or associated with a grouping application that allows for the creation of groups of meetings is provided. The scheduling application and the grouping application may further be provided as part of a meeting management application. According to further embodiments of the present invention, groups of meetings that have been defined can be manipulated as a group. Therefore, a modification can be applied to a number of meetings automatically, without requiring manual entry or human assistance with respect to each meeting to which the modification is applied. As a result, the management of related meetings is facilitated, and the need for repetitive rescheduling of related meetings can be avoided.

The scheduling application incorporates or is associated with a grouping application. In general, the scheduling application maintains records of meetings entered by a user. Information associated with each entered meeting can include a description, date, time, place, participants, required resources or other information describing or related to the meeting. In addition, the scheduling application may provide a user interface, to allow the user to enter new meeting information, or to modify previously entered meeting information. The grouping application allows for the identification and/or definition of groups of meetings. In addition, the grouping application may provide a user interface that allows a user to specify or determine the meetings that are included in different groups of meetings. For example, the grouping application may allow the user to enter one or more pieces of information characterizing a group of meetings that the user used to create or designate the group. The grouping application may then operate as a filter, to locate meetings maintained by the scheduling application that meet the specified criteria.

The scheduling application may also allow a user to modify information pertaining to each meeting within a group of meetings automatically (i.e. without requiring manual entry of the modification with respect to each individual meeting included in the grouping). The scheduling application may additionally provide information regarding conflicts between meetings, or between a meeting and another scheduled activity. This facility is particularly useful where one or more meetings within a first group also belong to another group. Furthermore, identification of conflicts may be performed in connection with every meeting in an identified first group of meetings, or within any other groups that a meeting within the first group belongs.

In accordance with other embodiments of the present invention, a process or method for managing meetings by grouping is provided. According to such a method, a user may enter meeting information through a scheduling application. As information is entered, the scheduling application may check for potential conflicts with other meetings or events. According to the method, a user may also modify information related to meetings. Modified meeting information may also be checked to determine whether it presents a potential conflict. Embodiments of the present invention also allow a user to define or identify a group of related meetings. The identification or definition of a group of meetings may comprise receiving information comprising grouping criteria from the user. Once a grouping has been defined, information associated with each meeting included in the grouping can be modified globally by the user. In response to a global modification, the scheduling application may determine whether the modification applied to all the meetings in the grouping presents a potential conflict to any other meeting or event.

Additional features and advantages of the present invention will become more readily apparent from the following discussion, particularly when taken together with the accompanying drawings.

DETAILED DESCRIPTION

Figure 1:
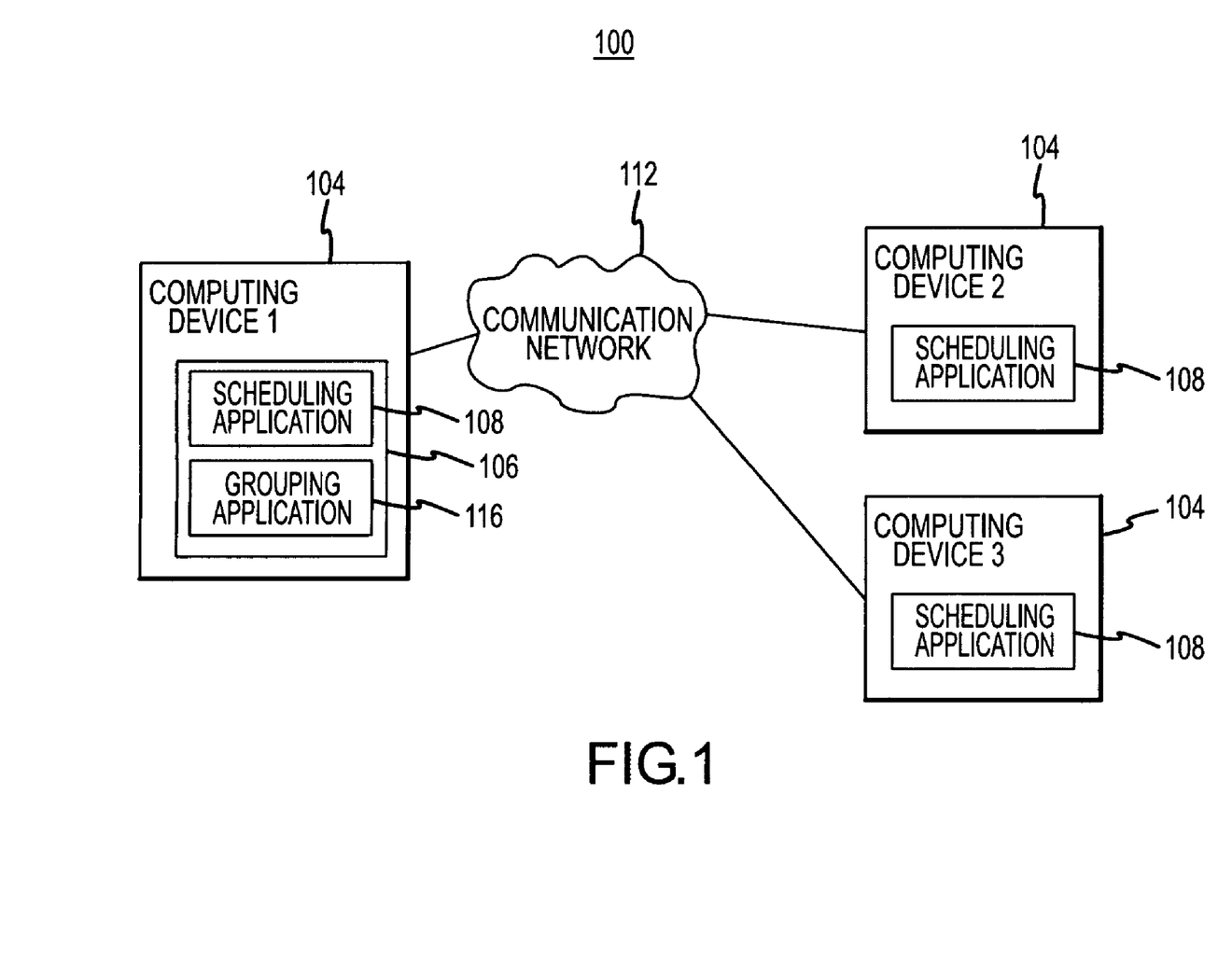
FIG. 1 is a block diagram of a system incorporating a number of devices and scheduling applications in accordance with embodiments of the present invention.

In FIG. 1, a system 100 incorporating a number of computing devices 104 and scheduling applications 108 is depicted. More particularly, each computing device 104 incorporates or is associated with a scheduling application 108. In addition, the various computing devices 104 are in communication with one another over a communication network 112. Furthermore, at least one computing device 104 includes a scheduling application 108 that incorporates or is associated with a grouping application 116. The scheduling application 108 and the grouping application 116 may together comprise a meeting management application 106.

In general, a computing device 104 in accordance with embodiments of the present invention may comprise any device capable of executing or implementing a meeting management application 106. Accordingly, examples of a computing device include various integrated computing devices, such as a general purpose computing device (e.g. a personal computer), a personal digital assistant (PDA) a cellular telephone incorporating or providing scheduling functionality, a dedicated scheduling device or electronic calendar, or other device. Furthermore, the execution of a meeting management application 106 may be distributed among a number of computing devices. For example, data may be maintained in a computing device comprising a network storage device.

As can be appreciated by one of skill in the art, different computing devices 104 and/or different meeting management applications 106 may be associated with different users. For example, the first computing device 104 and the associated meeting management application 106 may be used by a first user and may include meeting information entered by the first user, while the second computing device 104 and the associated meeting management application 106 may be associated with a second user and may include meeting information entered by the second user. As can further be appreciated by one of skill in the art, the communication network 112 may facilitate the exchange of meeting and other information between scheduling applications 108, whether those scheduling applications are part of a meeting management application 106 incorporating a grouping application 116 as described herein, or otherwise.

Figure 2:
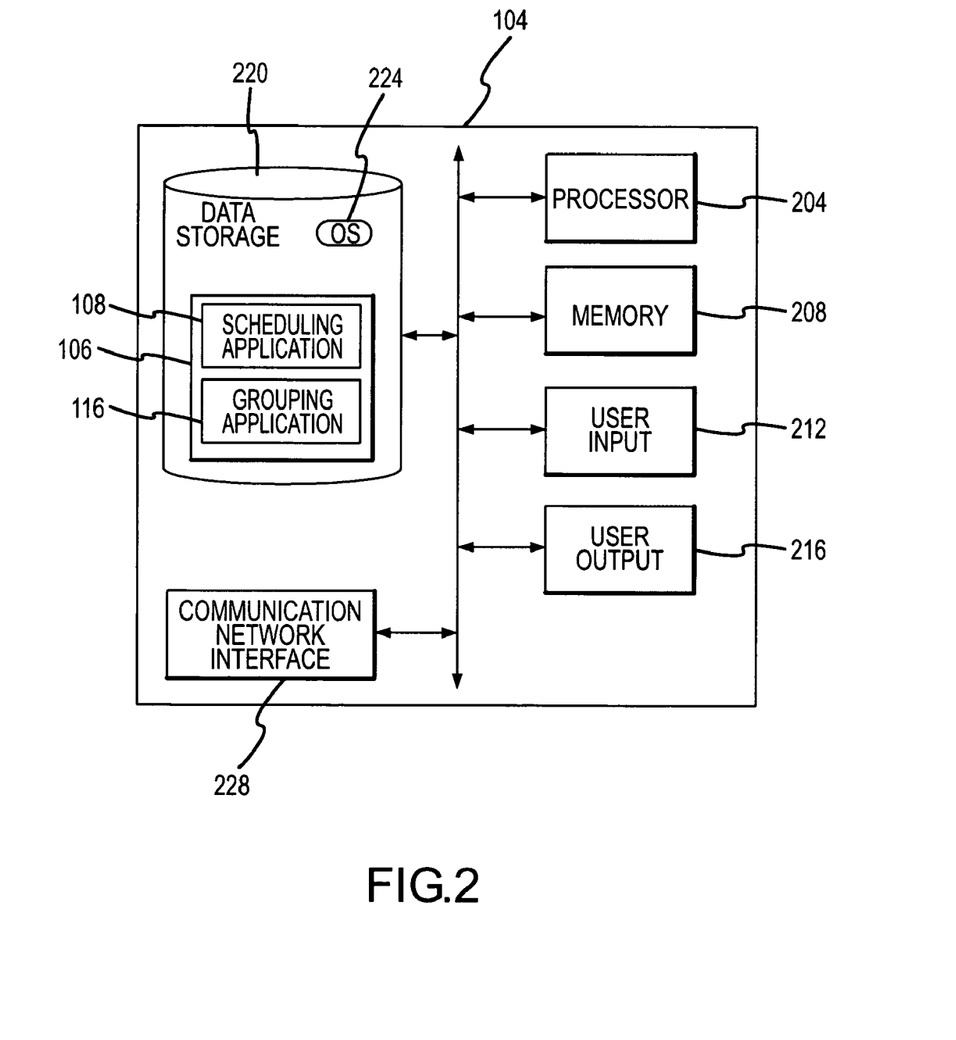
FIG. 2 is a block diagram of a computing device incorporating a scheduling application in accordance with embodiments of the present invention.

With reference to FIG. 2, components that may be included in a computing device 104 in accordance with embodiments of the present invention are depicted. The components may include a processor 204 capable of executing program instructions. Accordingly, the processor 204 may include any general purpose programmable processor or controller for executing application programming. Alternatively, the processor 204 may comprise a specially configured application specific integrated circuit (ASIC). A processor 204 generally functions to run programming code implementing several of the functions performed by the computing device 104. As will be described in greater detail elsewhere herein, such functions may include a scheduling function or application 108 for scheduling meetings and otherwise maintaining meeting information, and a grouping application 116, which may be incorporated in or integrated with the scheduling application as part of a meeting management application 106, for defining and/or identifying groups of meetings.

A computing device 104 may additionally include memory 208 for use in connection with the execution of programming by the processor 204, and for the temporary or long term storage of data or program instructions. For example, the memory 208 may be used in connection with the operation of a scheduling application 108 and/or a grouping application 116 as described herein. The memory 208 may comprise solid state memory resident, removable or remote in nature, such as DRAM and SDRAM. Where the processor 204 comprises a controller, the memory 208 may be integral to the processor 204.

In addition, various user input devices 212 and user output devices 216 may be provided. A user input device 212 may comprise a means for receiving meeting information and group selection parameters. Examples of input devices 212 include a keyboard, a numeric keypad, a pointing device combined with a screen or other position encoder, and a microphone. A user output device 216 may comprise a means for outputting at least some information related to a group of selected meetings. Examples of user output devices 216 include a graphic display, an alpha-numeric display, a printer, indicator lamp, and speaker.

A computing device 104 may also include data storage 220 for the storage of application programming and/or data. For example, operating system software, 224 may be stored in the data storage 220. Examples of applications that may be stored in the data storage 220 include scheduling application 108 and grouping application 116 software, as described herein. As illustrated, the scheduling application 108 and the grouping application 116 may together comprise a meeting management application 106. Furthermore, the scheduling application 108 may comprise a means for storing and organizing meeting information, and for detecting conflicts between meetings. Accordingly, the scheduling application 108 in accordance with embodiments of the present invention may include or operate in association with an automated rules engine that operates to detect conflicts. Furthermore, a scheduling application 108 incorporating or associated with an automated rules engine may suggest a resolution to a detected conflict. The grouping application 116 may comprise a means for selecting meetings according to group selection parameters.

Other applications that may be stored in data storage 220 include applications associated with performing any functions that may be performed in addition to the functions associated with execution of the scheduling application 108 and the grouping application 116. Particular examples of such additional applications include a telephony, email, address book, calculator or other applications.

A computing device 104 may additionally include a communication network interface 228. An example of a communication network interface 228 includes a packet data network interface, such as a wired or wireless Ethernet interface, for example where the computing device 104 comprising a general purpose computer. Additional examples of a communication network interface 228 include a telephony network interface, such as a CDMA, TDM, GSM, PSM, or satellite interface, Bluetooth, WIFI, IrDA or other wireless or wire line interface.

With reference again to FIG. 1, in which a number of computing devices 104 are included within a system 100, those devices may communicate with one another over the communication network 112. The communication network 112 may comprise one or more networks of one or more types. For example, a communication network may comprise a packet data network, such as the Internet, an intranet, virtual private network, or a combination of one or more such networks. As additional examples, the communication network 112 may comprise a switched circuit network, such as the public switched telephony network (PSTN), a private switched network or wireless voice and/or data networks, such as telephone networks or wireless data networks. In addition, communication network 112 may combine several different network types into one larger communication path.

Although the system 100 illustrated in FIG. 1 depicts a number of computing devices 104 interconnected to one another by a communication network 112, it should be appreciated that a communication network and multiple computing devices 104 are not necessary to embodiments of the present invention. In particular, a scheduling application 108 and grouping application 116 may be operated on or in connection with a single computing device 104. In other embodiments, an interconnection to one or more other computing devices 104 can be advantageously used to receive information to assist in the identification of potential conflicts, or to otherwise share data. Furthermore, as depicted in FIG. 1, a grouping application 116 need not be associated with more than one computing device. However, for example, in order to provide or facilitate providing a grouping application 116 to users of other computing devices 104, a grouping application 116 may be associated with more than one computing device 104. Furthermore, it should be appreciated that if multiple computing devices 104 are included in a system, they need not be in real time communication with one another. For example, different computing devices 104 may exchange information periodically.

Figure 3:
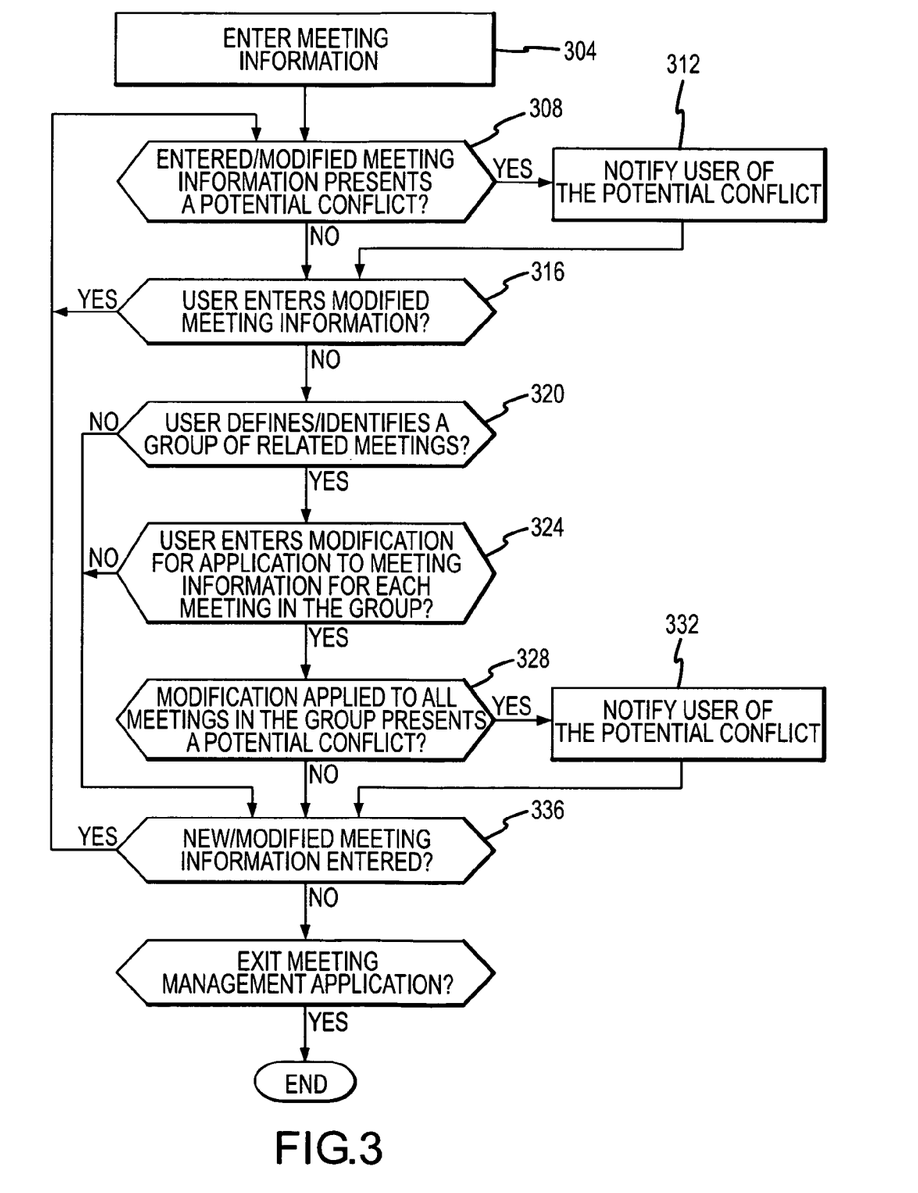
FIG. 3 is a flow chart depicting aspects of a process in accordance with embodiments of the present invention.

With reference now to FIG. 3, aspects of a process that allows for the grouping of meetings and the manipulation of meeting groups are illustrated. Initially, at step 304, information related to a meeting is entered by a user. Information related to a meeting can include identifying information, such as a description of the meeting; a topic for the meeting; scheduled start time for the meeting; scheduled end time for the meeting; the place at which an in-person meeting is to be held or contact information for the participants in connection with a meeting to be conducted remotely; resources, such as meeting rooms, required projectors, conferencing equipment, etc.; location specific required resources; or pre-work (i.e. things that need to be prepared or completed in preparation for a meeting). Other examples of information related to a meeting that can be entered by a user include the subject of the meeting, the participants, or any other information deemed to be significant by the user in connection with the meeting. As can be appreciated by one of skill in the art from the description provided herein, meeting information may be entered by a user through one or more user inputs 212, and entered information may be verified by the user through one or more user outputs 216, provided as part of a computing device 104 running a scheduling application 108.

At step 308, a determination may be made as to whether entered (or modified) meeting information presents a potential conflict. Potential conflicts can be identified by searching scheduling application records 108 for conflicts. Examples of conflicts include different meetings having a common participant that are scheduled for the same time, different meetings booked for the same place at the same time, meetings booked at a time during which one or more of the participants has been scheduled to participate in another event, or meetings scheduled in time or place such that one or more of the participants would be unable to attend. As can be appreciated by one of skill in the art from the description provided herein, information related to potential conflicts with an entered meeting can comprise other meeting information, or information related to other activities. Furthermore, potentially conflicting information can be entered into a scheduling application 108 operating to check for potential conflicts, and/or such information can be available to a scheduling application 108, for example in the form of scheduling information stored in data storage 220 on the computing device 104 on which the scheduling application 108 is running, or on another computing device 104. If the entered (or modified) meeting information presents a potential conflict, the user is notified of the potential conflict (step 312). Notification of the potential conflict may be in the form of a textual and/or visual message indicating the existence of a conflict. The information provided to the user may include an identification of the conflicting meeting or event. Notification may additionally include suggestions for alternate times in which to schedule the meeting for which information has been entered or modified, or for the conflicting meeting or event.

After notifying the user of a potential conflict (at step 312) or after determining that the entered (or modified) meeting information does not present a potential conflict (at step 308), a determination is made as to whether a user has entered modified meeting information (step 316). Re-entry of modified meeting information may include changes to previously entered meeting information. Such changes may be entered in response to various information or eventualities, including notification received from the scheduling application 108 of a potential conflict at step 312. If modified information has been entered, the process may return to step 308 to check for potential conflicts.

If the user has not entered modified meeting information, the process may determine whether the user has defined or identified a group of related meetings (step 320). As will be described in greater detail elsewhere herein, the definition or identification of a group of related meetings can comprise the execution of a query entered by the user, the application of a user defined filter to information related to a number of meetings, or the tagging or identification of a number of meetings by the user as being associated with one another. If the user has defined or identified a group of related meetings, a determination may then be made as to whether the user has then entered a modification for application to meeting information for some or all of the meetings in the defined group (step 324). For example, a user who has defined a group of meetings by identifying all meetings occurring on a particular day at a particular location may enter a modification comprising a change in the date for all such identified meetings in response to a change in the user's travel plans that necessitate rescheduling the meetings to a new day. As another example, modified meeting information in the form of the persons scheduled to participate in one of the meetings in a group may be entered. Furthermore, the modified meeting information may be applied to all of the meetings in a defined group automatically, where automatically means that the information is applied to all of the meetings in a group without human assistance. For example, the information can be entered by a user once, and then automatically applied to all of the meetings within a group by entering a command to apply the information to all of the meetings within the group, and without requiring individual entry of the information by the user for each of the meetings. In accordance with further embodiments of the present invention, modified meeting information may be applied automatically to each meeting within a group to which the modification is relevant. For example, the removal of one meeting participant may be applied to those meetings in the group that included meeting information that included the removed participant.

In response to determining that a modification for application to all or a number of the meetings in a group has been entered, a determination as to whether the modification applied to the meetings presents a potential conflict (step 328). That is, a check may be made to determine whether any of the meetings included in the defined group subject to the entered modification conflicts with any other meeting or event. Furthermore, a check for conflicts may be made with respect to any other meeting or event in the group, and/or any other meeting or event in any group. If a conflict or potential conflict is identified, the user is notified of the potential conflict (step 332). As another example, if the time of a group of meetings is shifted such that at least one of the meetings is scheduled outside of normal business hours, the user may be notified, and the process may offer to reschedule that meeting or meetings for the next day. After notifying the user of the potential conflict, or after determining that no potential conflicts exist, a determination may be made as to whether new or modified meeting information has been entered (step 336). That is, a user may continuously enter new or modified meeting information as part of the operation of a scheduling application 108. If new or modified meeting information has been entered, the process may return to step 308. If new or modified meeting information has not been entered, a determination may be made as to whether the user has elected to exit the meeting management application 106. If the user has not chosen to exit the meeting management application 106, a determination may be made as to whether a command to exit the meeting management application 106 has been received (step 340). If a command to exit is not received, the process may return to step 336 to await new or modified meeting information. Alternatively, if a command to exit has been received, the process for entering new or modified meeting information may end.

In accordance with embodiments of the present invention, when a user enters a modification to a meeting that is part of a group (e.g., at step 316), the user may be provided with an option to apply the modification to each meeting in the group. For example, a change or shift in the time that a meeting is to occur can be applied to each meeting in an associated group. The option to apply a change in one meeting to each meeting in a group can be presented to the user through a pop-up dialog asking if the modification should be applied to the group or just the single meeting. Alternatively or in addition, a menu item or button can be provided to allow a user to select whether the modification will apply to the group or just the single meeting.

Figure 4:
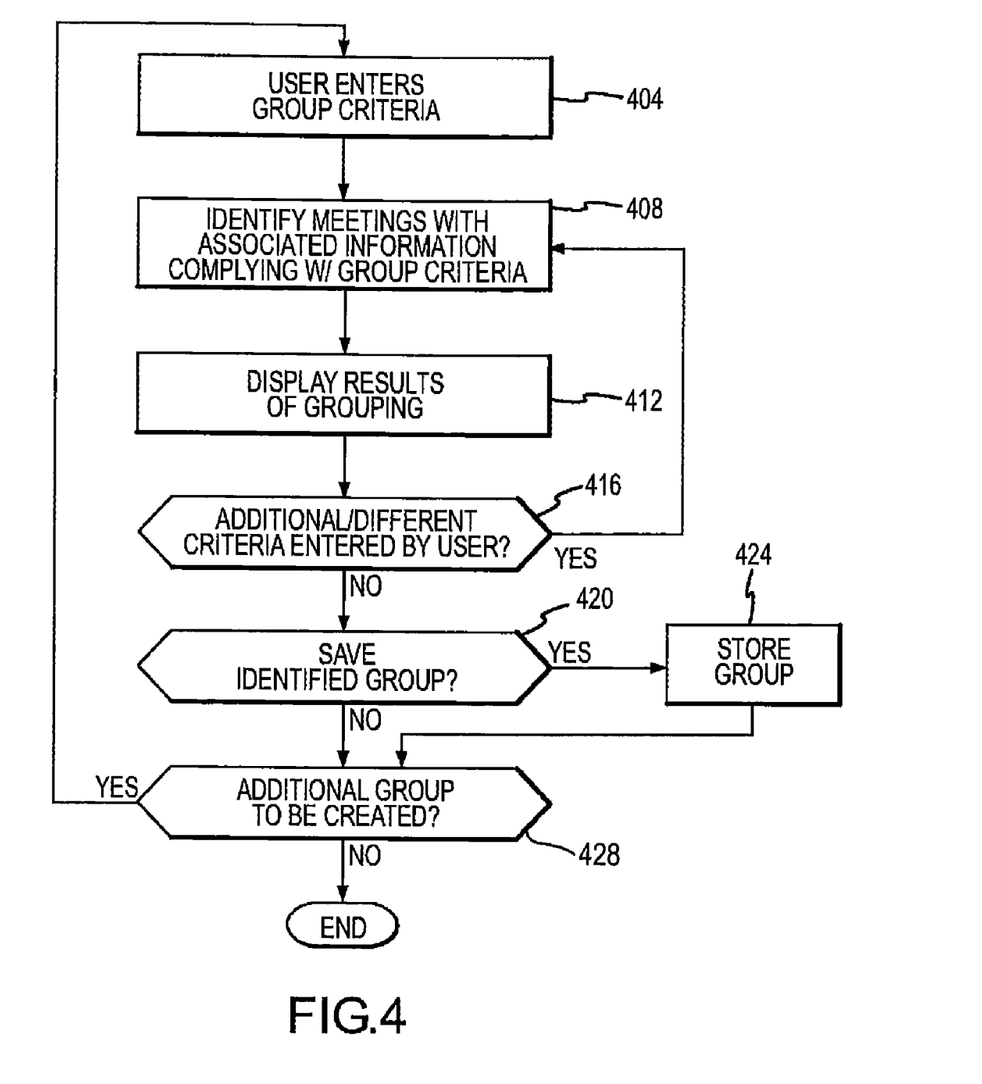
FIG. 4 is a flow chart depicting other aspects of a process in accordance with embodiments of the present invention.

With reference now to FIG. 4, aspects of the operation of the grouping application 116 in accordance with embodiments of the present invention are illustrated. Initially, at step 404, the user enters group criteria. In general, group criteria may include one or more pieces of information associated with one or more meetings entered in the scheduling application 108. At step 408, meetings with associated information that complies with the group criteria are identified.

At step 412, the results of performing the requested grouping are displayed to the user. For example, a list of meetings associated with the group criteria entered by the user may be listed. For example, the group criteria may comprise at least one user selected or entered term. At step 416, determination is made as to whether additional criteria have been entered by the user. For example, a user may wish to narrow the list of meetings included in a group by entering additional terms or criteria. Alternatively, the user may wish to enter different criteria or may wish to remove criteria, in order to modify the meetings included in the group. If additional or different criteria is entered by the user, the process may return to step 408, and the list of meetings included in the group may be revised. Group criteria that may be entered include the identity of one or more meeting participants, the place of the meeting, the meeting topic, the day of the week scheduled for the meeting, or any other meeting information. In accordance with further embodiments of the present invention, one or more sub-groupings may be established within a larger group of meetings, which may themselves be analyzed and modified as a group if desired.

If no additional criterion is entered by the user, a determination may be made as to whether the user has indicated that the identified group of meetings should be saved (step 420). If the group is to be saved, the results of the groupings are stored, for example as a list of included meetings (step 424). After storing the group or determining that an identified group is not to be stored, a determination is made as to whether the user desires to create additional groups of meetings (step 428). If it is determined that an additional group is to be created, the process may return to step 404. If no additional groups are to be created, the process may end.

In accordance with embodiments of the present invention, a user may enter modified meeting information on a provisional basis. That is, a user may enter modified information as part of performing a "what if" scenario, to determine the effects of a potential change. If the modified information entered provisionally creates unacceptable conflicts or is otherwise determined to be undesirable, that information may be discarded, without having changed the stored meeting information. Alternatively, if the modified information does not create any unacceptable conflicts, the user may choose to apply the modified meeting information. As can be appreciated by one of skill in the art after appreciation of the present disclosure, modified information entered on a provisional basis may apply to a single meeting or to a group of meetings. Accordingly, embodiments of the present invention can comprise a planning tool that provides a convenient means for determining the effects of potential changes.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include alternative embodiments to the extent permitted by the prior art.

What is claimed is:

1. A method for scheduling related events, comprising:
a processor receiving first information for a first meeting;
the processor receiving second information for a second meeting, wherein the first meeting and the second meeting are not part of a recurring meeting;
the processor receiving a definition of a first group of meetings, the first group comprising the first meeting and the second meeting, wherein defining said first group of meetings comprises:
the processor receiving group meeting information for the first group of meetings, wherein the group meeting information is associated with both the first meeting and the second meeting, wherein the group meeting information includes an identifier common to the first meeting and the second meeting, wherein said identifier is entered by a user and is not selected from a list of identifiers, and wherein said identifier is not an assigned category;

the processor receiving a modification to the group meeting information, wherein the modification pertains to a parameter of the first meeting and the second meeting, wherein the modification is specified as being applicable to the first meeting and the second meeting; and the processor automatically applying the modification to the first meeting and the second meeting, wherein the entered modification relates to a parameter of the first meeting and the second meeting and not to a presentation of the meetings in a scheduling program.

2. The method of claim 1, wherein defining a first group of meetings including at least some of the number of meetings further includes:

performing a first query, wherein the query includes entering a search term common to all meetings in said first group of meetings and specifies a group criterion that includes at least a first user selected term, and wherein the query is run to identify meetings associated with meeting information that includes the at least a first user selected term.

3. The method of claim 2, further comprising:
storing a list of the meetings included in the first group of meetings.

4. The method of claim 2, further comprising:
defining a second group of meetings including at least some of the number of meetings, wherein defining a second group of meetings includes:

performing a second query, wherein the second query specifies a group criterion that includes at least a second user selected term, and wherein the query is run to identify meetings associated with meeting information that includes the second user selected term.

5. The method of claim 2, further comprising:
defining a second group of meetings including at least some of the number of meetings, wherein defining a second group of meetings includes:

performing a second query, wherein the second query specifies group criteria that includes the first user selected term and a second user selected term, and wherein the query is run to identify meetings associated with meeting information that includes the second user selected term, and wherein the first group of meetings includes all of the meetings included in the second group of meetings.

6. The method of claim 1, further comprising:
at least after entering the modification to the group meeting information, determining whether any meeting information associated with any meeting in the defined first group of meetings conflicts with any meeting outside of the defined first group of meetings.

7. The method of claim 6, wherein the group meeting information associated is entered by a first user, wherein determining whether any meeting information associated with the first group of meetings conflicts with any meeting outside of the defined group of meetings includes checking meeting information entered by a second user.

8. The method of claim 1, further comprising:
after entering a modification to the group information, determining that at least one meeting in the defined first group of meetings occurs outside of normal business hours; and presenting the user with an option to reschedule the at least one meeting for the next business day.

9. The method of claim 1, wherein the group meeting information includes at least one of a scheduled start time for each meeting in the group of meetings, a scheduled end time for each meeting in the group of meetings, a scheduled day of the week for each meeting in the group of meetings, a location of each meeting in the group of meetings, a topic for each meeting in the group of meetings, a list of meeting participants for each meeting in the group of meetings, contact information for the participants for each meeting in the group of meetings, location specific required resources for each meeting in the group of meetings, or pre-work for each meeting in the group of meetings.

10. The method of claim 1, wherein the group information includes a portion of the first information or the second information.

11. The method of claim 1, further comprising:
entering a modification to the first information associated with the first meeting; and in response to said entering a modification to the first information, presenting the user with a dialog requesting that the user indicate whether to apply the modification to the second meeting.

12. An apparatus for scheduling groups of meetings, comprising:

a first user input device, wherein the first user input is operable to receive meeting information and grouping information;

a processor, wherein the processor is operable to execute application instructions;

data storage, including:
scheduling application instructions, wherein the scheduling application instructions are executed by the processor to receive and maintain meeting information from the first user input device and to provide scheduling functions;

grouping application instructions, wherein the grouping application instructions are executed by the processor to receive input from the first user input device regarding meeting group parameters and to define meeting groups using the meeting group parameters from the meeting information maintained by the scheduling application, wherein for a first meeting group said meeting group parameters include at least one search term that is common to all meetings in said first meeting group, and wherein at least a first meeting in said first meeting group is not related to at least a second meeting as a recurrence of said second meeting or as a meeting in a like category, wherein a modification of a second meeting group parameter is received from said user input device, wherein said modification to the second meeting group parameter is automatically applied to each meeting in the first meeting group, and wherein said modification relates to meeting information; and a user output device, wherein at least some meeting information for at least said first meeting group is presented to the user.

13. The apparatus of claim 12, wherein the data storage additionally includes information comprising an identification of meetings included in said first meeting group defined by parameters input through the first user input device.

14. The apparatus of claim 12, wherein the scheduling application instructions additionally are executed to perform a scheduling conflict identification function.

15. The apparatus of claim 12, wherein the first user input device, the processor, and the data storage are provided as part of a first integrated computing device.

16. The apparatus of claim 15, further comprising:
a communication interface, wherein the scheduling application instructions receive meeting information entered through a second user input device that is not integral to the first integrated computing device through the communication interface, and wherein the scheduling conflict identification function identifies conflicts between meeting information entered through the first user input device and meeting information entered through the second user input device.

17. The apparatus of claim 12, wherein the scheduling application and the grouping application are part of a meeting management application, wherein said meeting information that is modified includes a scheduled start time for each meeting in the meeting group, a scheduled end time for each meeting in the meeting group, a scheduled day of the week for each meeting in the meeting group, a location of each meeting in the meeting group, a topic for each meeting in the meeting group, a list of meeting participants for each meeting in the meeting group, contact information for the participants in each meeting in the meeting group, or location specific required resources for each meeting in the meeting group.

18. A computer program product, comprising computer executable instructions stored on a computer readable medium, which, when executed by a processor of a computer, causes the computer to perform a method for grouping meetings, the computer executable instructions, comprising:

instructions to receive first information for a first meeting;

instructions to receive second information for a second meeting, wherein the first information and the second information include a first search term, and wherein the first meeting information and the second meeting information includes at least a first participant and a second participant;

instructions to receive group meeting information for a first group, wherein at least a portion of the first meeting information or the second meeting information is part of the group meeting information, wherein the group meeting information also includes the first search term, and wherein the group meeting information includes at least a first participant and a second participant;

instructions to store the received group meeting information;

instructions to organize the received group meeting information;

instructions to select the first meeting and the second meeting as part of the first group according to received group information parameters;

instructions to output at least some information related to the first meeting and the second meeting, wherein said first search term is not an assigned category, and wherein the second meeting is not a recurrence of the first meeting;

instructions to add a third participant to the group meeting information; and instructions to automatically apply the addition of the third participant to the first meeting and the second.

19. The system of claim 18, further comprising:

instructions to determine conflicts between information associated with the first meeting and information associated with the second meeting.

20. The system of claim 18, further comprising:

instructions to receive a second modification to a second item of group information; and instructions to automatically apply the second modification to the first meeting and the second meeting wherein the second modification relates to at least one of a scheduled start time for each meeting in the group of meetings, scheduled end time for each meeting in the group of meetings, a scheduled day of the week for each meeting in the group of meetings, a location of each meeting in the group of meetings, a topic for each meeting in the group of meetings, contact information for the participants in each meeting in the group of meetings, or location specific required resources for each meeting in the group of meetings.

* * * * *